United States Patent [19]

Kato

[11] Patent Number: 5,335,231
[45] Date of Patent: Aug. 2, 1994

[54] REMOTE DIAGNOSIS SYSTEM FOR NUMERICAL CONTROL APPARATUS

[75] Inventor: Minoru Kato, Niwa, Japan
[73] Assignee: Okuma Corporation, Nagoya, Japan
[21] Appl. No.: 848,361
[22] Filed: Mar. 9, 1992
[30] Foreign Application Priority Data

Mar. 20, 1991 [JP] Japan ................................. 3-081617

[51] Int. Cl.⁵ ........................................... G01R 31/28
[52] U.S. Cl. .............................. 371/15.1; 318/568.1; 318/569; 371/18
[58] Field of Search .................... 371/15.1, 18, 16.1, 371/22.1; 318/568.1, 569

[56] References Cited

U.S. PATENT DOCUMENTS 4,087,808  5/1978  Herndon, Jr. .............. 340/324 AD
5,115,177  5/1992  Tanaka et al. .
5,117,371  5/1992  Kristen et al. .
5,124,622  6/1992  Kawamura et al. ............... 318/569
5,274,546  12/1993  Kinoshita ........................ 371/8.1

Primary Examiner—Robert W. Beausoliel, Jr.
Assistant Examiner—Albert Decady
Attorney, Agent, or Firm—Wenderoth, Lind & Ponack

[57] ABSTRACT

A remote diagnosis system for a numerical control apparatus for diagnosing the operation state of the numerical control apparatus by means of a terminal unit disposed away from the numerical control apparatus by transmitting image data of the numerical control apparatus from a diagnosis data transmitting unit attached thereto to the numerical control apparatus includes: an image data read out unit for reading out an image data corresponding to one character in character representation from an image storage unit bearing the image data; and a character coding unit for transforming the image data into a character code if a character code exists corresponding to the image data read out by the image data read out unit.

2 Claims, 5 Drawing Sheets

1

REMOTE DIAGNOSIS SYSTEM FOR NUMERICAL CONTROL APPARATUS

BACKGROUND OF THE INVENTION

The present invention relates to a remote diagnosis system for a numerical control apparatus which is capable of diagnosing the operation state of the numerical control apparatus by means of a terminal unit disposed away from the numerical control apparatus through communication between the numerical control apparatus and the terminal unit.

FIG.1 is a block diagram showing an embodiment of a conventional remote diagnosis system for a numerical control apparatus. In a numerical control apparatus (CNC) 1, a CPU 11 reads and analyzes data stored in a data memory 13 in accordance with a program stored in a program memory 12. On the basis of the analyzed result, the CPU 11 controls the delivery of data between an operation panel control section 14 and a machine control section interface 15. A page operation command SA, which is inputted by an operator through a keyboard 22 on an operation panel 2 belonging to the CNC 1, is read in to be analyzed by the operation panel control section 14 in the CNC 1 through a synthesizing circuit 39 disposed in a diagnosis data transmission unit 3. From the analyzed result, image data SB in accordance with the operation state of the CNC 1 are prepared to be displayed on a CRT 21 in the operation panel 2 through a distributor 38 disposed in the diagnosis data transmission unit 3. In the diagnosis data transmission unit 3 belonging to the CNC 1, a CPU 31 reads and analyzes data stored in a data memory 33 in accordance with a program stored in a program memory 39. On the basis of the analyzed result, the CPU 31 controls communication and delivery of data between a page operation means 34, an image storage means 36, a communication means 37, the distributor 38 and the synthesizing circuit 39.

In the terminal unit 4 at a long distance from the CNC 1, a CPU 41 reads and analyzes data stored in a data memory 43 in accordance with a program stored in a program memory 42. On the basis of the analyzed result, the CPU 41 controls delivery of data between an image storage means 44, a communication means 46, a CRT 47 and a keyboard 48. Subsequently, a page operation command SA', which is inputted by the operator through the keyboard 48, is read in by the communication means 46, to thereby be transmitted through a telephone line TL to the communication means 37 in the diagnosis data transmission unit 3. The page operation command SA' accepted by the communication means 37 is sent out to the page operation means 34, to furthermore be transmitted through the synthesizing circuit 39 to the operation panel control section 14 in the CNC 1. In this operation panel control section 14, page-changeover is conducted based on the transmitted page operation command SA', and image data SB for the page are prepared to be stored through the distributor 38 to the image storage means 36 installed. The image data SB which have been stored in the image storage means 36 are, in turn, read in by the communication means 37 in which the data are data-compressed to be transmitted through the telephone line TL to the communication means 46 in the terminal unit 4. In the terminal unit 4, the compressed data is transformed into the original state and stored into the image storage means 44. The image data SB stored in the image storage means 44 is adapted to be transmitted to the CRT 47 to be displayed.

In the conventional remote diagnosis system in the numerical control apparatus described above, since the image data are used as the diagnosis data for the numerical control apparatus, the amount of data to be transmitted becomes markedly large, thus making it impossible to quickly send the data to the terminal unit, to thereby result disadvantageously in a large cost for the communication. As a result, the use of the telephone line is impractical so that it has been indispensable to engage a digital network and so on. Moreover, since the image data constitutes image information, it has been impossible to additionally provide for the terminal a multiprocessing function and the like which make it possible to treat the image data as significant information. Accordingly, it is desirable to use character code data as the diagnosis data in place of the image data; however, the character code data stays in the operation panel control section 14 as internal signals. Hence, in order to take out the character code data, the CNC 1 itself is required to be remodeled and incorporated into the diagnosis system to be a CNC-incorporated system. Such an incorporated system no longer has any merits which have been provided by a diagnosis system that does not depends upon the operation of the CNC 1. In addition, when the character code data are taken out from the operation panel control section 14, this disadvantageously makes it impossible for the image data to be transmitted.

SUMMARY OF THE INVENTION

The present invention has been accomplished in view of what is discussed above, and an object of the present invention is to provide a remote diagnosis system for a numerical control apparatus which is capable of transmitting to a terminal unit the diagnosis data which consists of a small amount of data to be transmitted and which can be handled as significant information.

According to one aspect of the present invention, for achieving the objects described above, a remote diagnosis system is provided for a numerical control apparatus which is capable of diagnosing the operation state of said numerical control apparatus by means of a terminal unit disposed away from said numerical control apparatus by transmitting image data of said numerical control apparatus from a diagnosis data transmitting unit attached thereto to said numerical control apparatus, comprising: an image data read out means for reading out an image data corresponding to one character in character representation from an image storage means bearing said image data; and a character coding means for transforming said image data into a character code if a character code exists corresponding to said image data read out by said image data read out means.

These together with other objects, features and advantages of the invention will become more readily apparent from the following detailed description when taken in conjunction with the illustration embodiment in the accompany drawings.

DESCRIPTION OF THE PREFERRED EMBODIMENT

Figure 1:
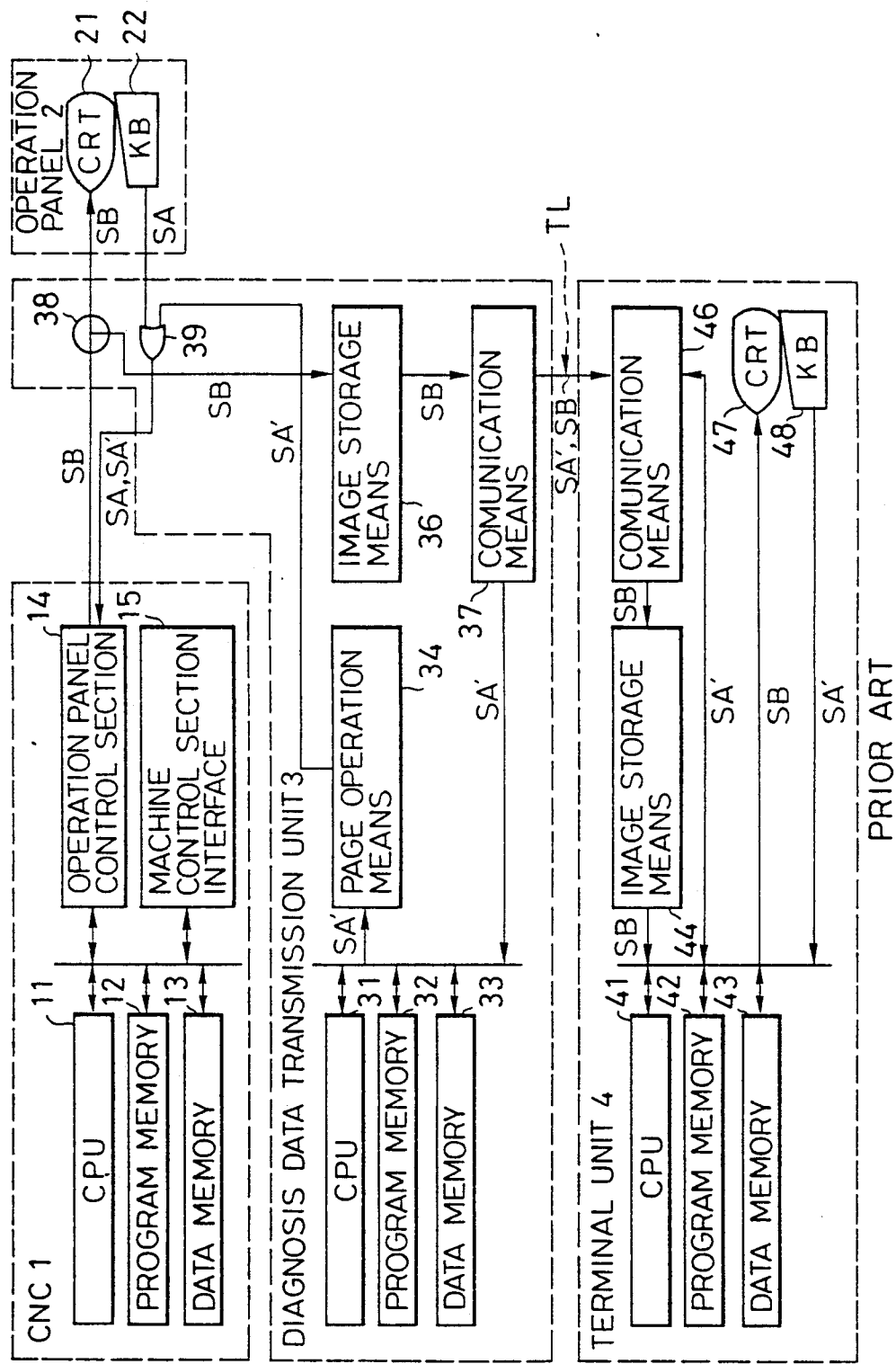
FIG. 1 is a block diagram showing an example of a conventionally used remote diagnosis system for a numerical control apparatus.
Figure 2:
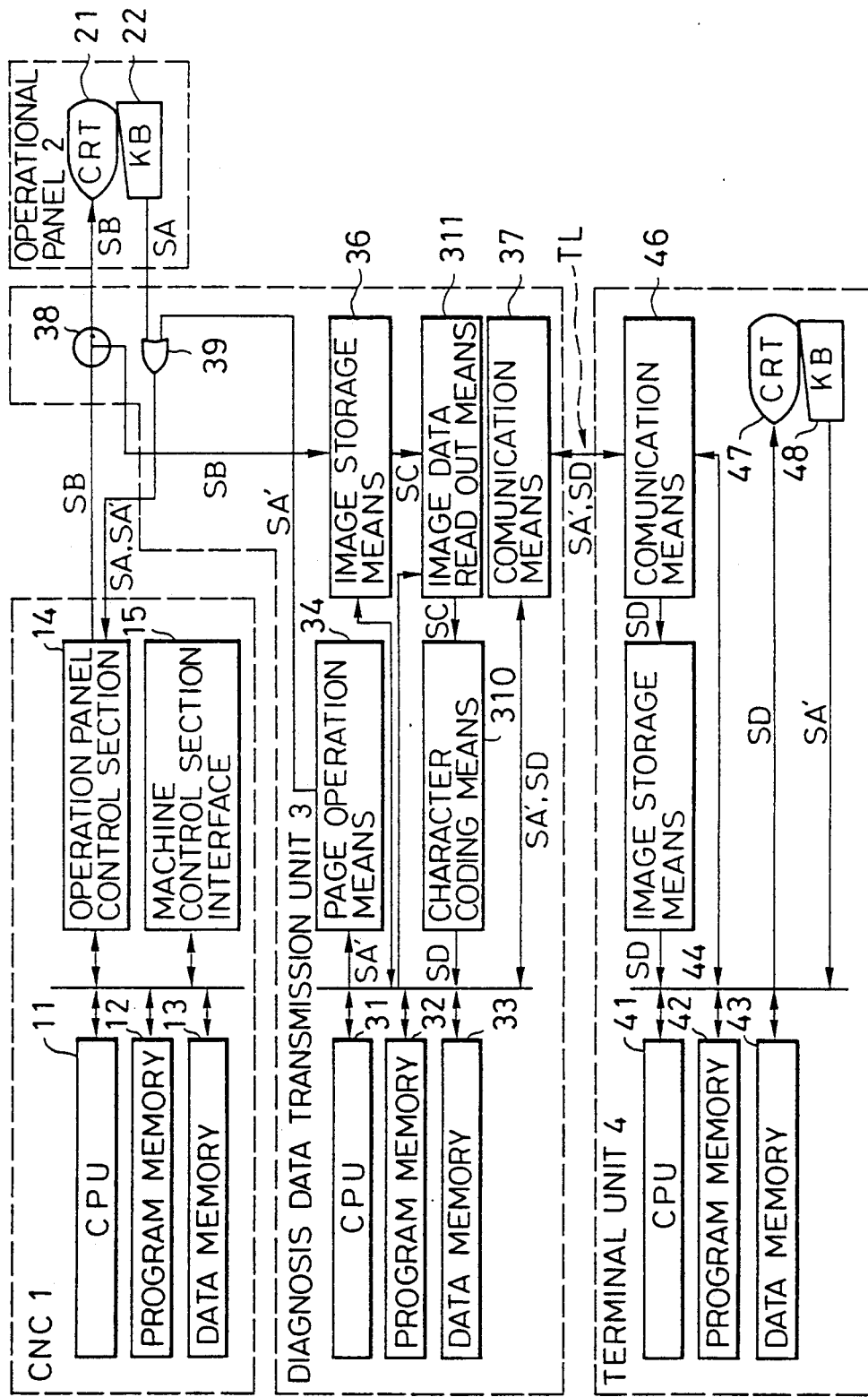
FIG. 2 is a block diagram showing an embodiment of a remote diagnosis system for a numerical control apparatus according to the present invention.

FIG. 2 is a block diagram showing an embodiment of a remote diagnosis system for a numerical control apparatus according to the present invention. The elements in common with those of FIG. 1 have been designated by the same numerical designations and an explanation thereof has been omitted.

Image data SB stored in an image storage means 36 installed in a diagnosis data transmission unit 3 are restructured into image data sets each corresponding to one character in a character representation to be sent as restructured diagnosis data SC to a character coding means 310. The restructured data SC which have been read in by the character coding means 310 are subjected to analysis for coding, and if there exists a character code corresponding to a data set, the data are transformed into the character code; if there is no character code corresponding to a data set, the data are transformed into a graphic character code which is used for a dummy character code. After this transformation, the transformed data are send to a communication means 37 as a character code/graphic code data SD, which in turn is transmitted through a telephone line TL to a communication means 46 belonging to a terminal unit 4. The character code/graphic code data SD which have been received by the communication means 46 are stored in an image storage means 44, and thereafter at first the data which have been transformed into character codes are displayed on the CRT 47, and subsequently the data which have been transformed into graphic codes are displayed on the CRT 47.

Figure 3:
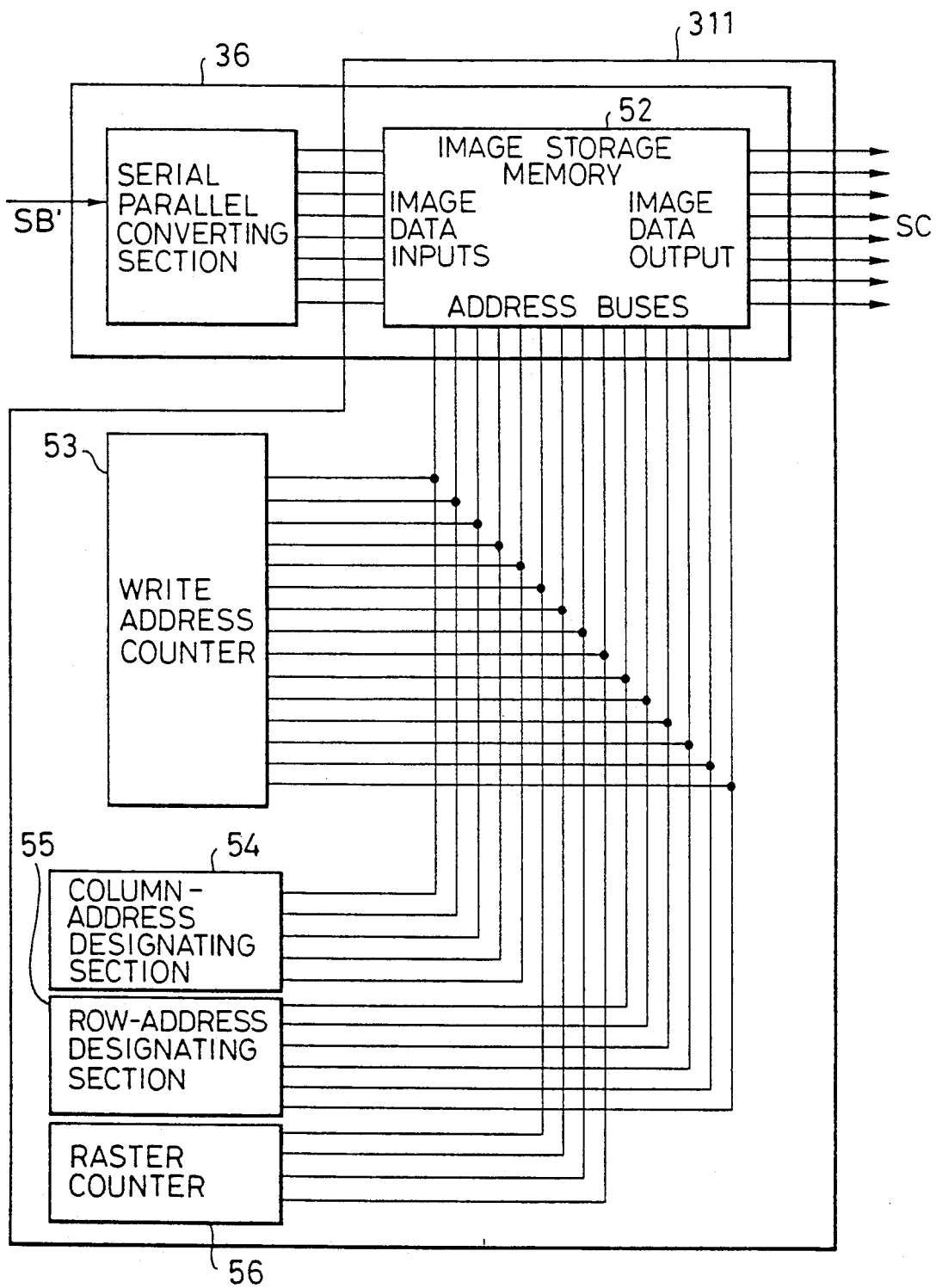
FIG. 3 is a block diagram showing an example of an image storage means and an image read out means of the system of the present invention.

FIG. 3 is a block diagram showing an example of the image storage means 36 and the image data read out means 311. The image data SB, which after preparation in an operation panel control section 14 is to be read in via a distributor 38 by a serial to parallel converting section 51 in the image storage means 36, are serial data consisting of a dot pattern. The image data SB are transformed in a serial to parallel converting section 51 into parallel data each of which consists of one byte. Each data byte is assigned an inside address of an image storage memory 52 by a write address counter 53, and sequentially stored as a first raster in a first character, a first raster in a second character, a first raster in a third character, etc., a second raster in tile first character, a second raster in the second character, a second raster in tile third character, etc., in order. Accordingly, in a case where a line on an image frame comprises sixty-four characters and a character is represented by sixteen rasters, extraction of image data for one character in character representation from the data stored in the image storage memory 52 can be conducted such that rasters of data whose addresses are 64 bytes apart are picked up sixteen times sequentially. More specifically, when image data on the first character are to be taken out, the column-address and row-address for the first character are designated on the image storage memory 52 by a column-address designating section 54 and a row-address designating section 55, and subsequently the raster numbers for the first character are designated on the image storage memory 52 from the first to the sixteenth by a raster counter 56. After completion with respect to the first character, the same procedures are repeated for the image data after the first character by the column-address designating section 54, the row-address designating section 55 and the raster counter 56, and consequently the restructured diagnosis data SC are sent out from the image data read out means 311 to the character coding means 310.

Figure 4:
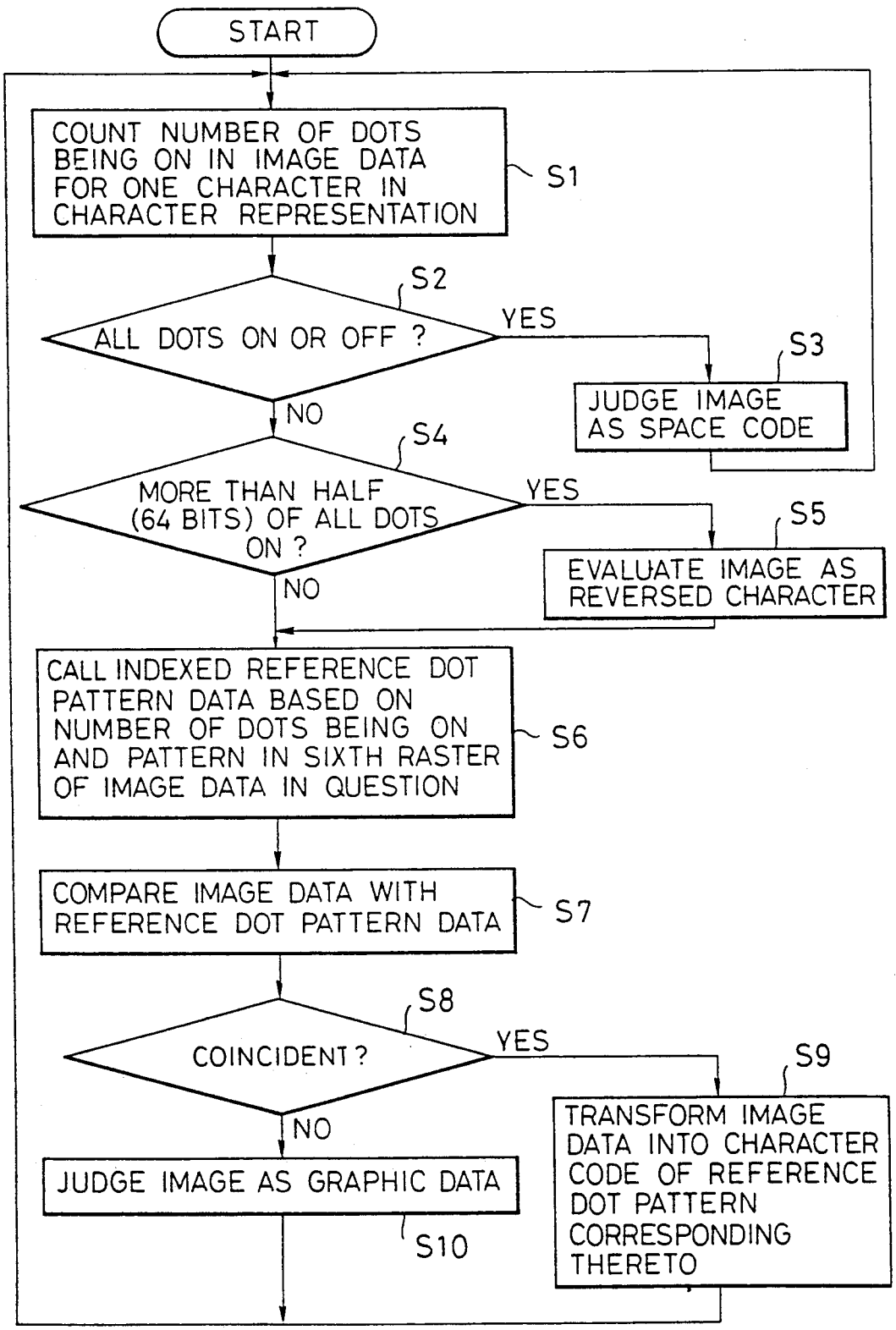
FIG. 4 is a flowchart showing an operational example of a character coding means according to the present invention.

FIG. 4 is a flowchart showing an operational example of the character coding means 310 which is a main section of the remote diagnosis system in tile numerical control apparatus of tile present invention. The character coding means 310 reads out the restructured diagnosis data SC from the image data read out means 311, and analyzes tile restructured diagnosis data SC sequentially from the image data of the first character thereof. Subsequently, the number of dots being on in the image data for one character in character representation is counted (Step S1). In either case where all the dots are on, or where all the dots are off with respect to one character image data, the image data for the character is judged as a space code (Steps S2 and S3), followed by returning to the Step S1, and the next image data is analyzed. On the other hand, in the case where all of the dots are not on, or all of the dots are not off with respect to one character image data, and if more than half of all of the dots are on, then the image data is to be evaluated as being a reversed character (Steps S4 and S5). Next to this, the reference dot pattern data are called which have in advance been indexed, in advance based on the number of the dots being on and the pattern in the sixth rasters of the image data in question (Step S6), in order to be compared with the image data (Step S7). In this comparison, if there is a reference dot pattern data which coincides with the image data in question, the image data is converted into the character code corresponding to the reference dot pattern data (Steps S8 and S9), whereas if there is no reference dot pattern data which coincides with the image data in question, the image data is judged as being graphic data, to thereby generate a graphic code (Step S10). This comparison is followed by returning to the Step S1 to repeat the aforementioned same operation.

Figure 5:
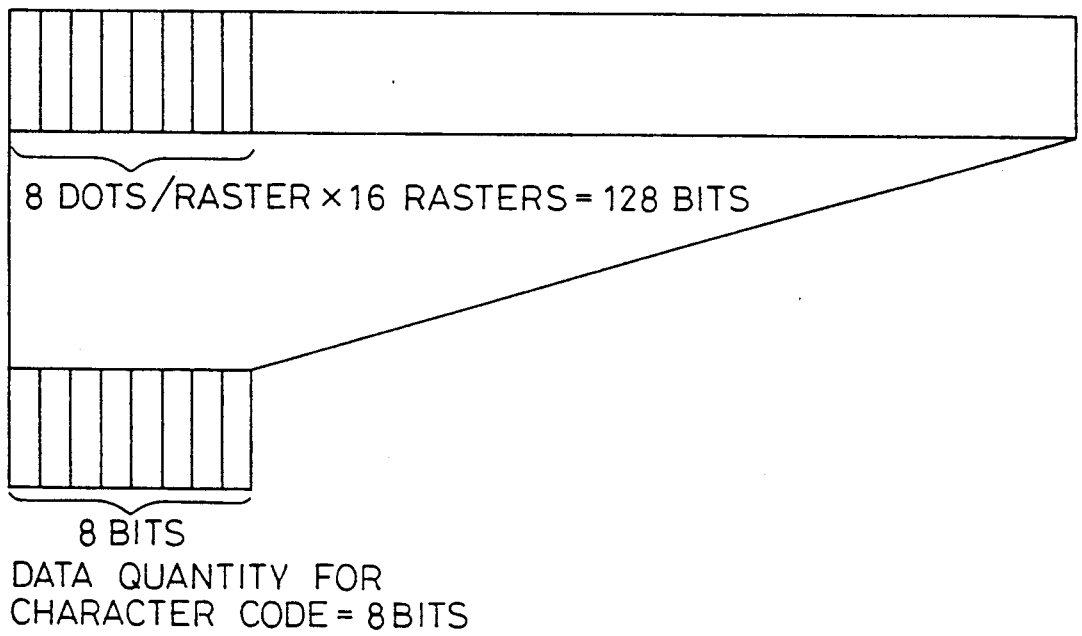
FIG. 5 is a diagram illustrating information amount of the image data and the character code data of the system of the present invention.

In the present invention, with respect to the image data which can be character-coded among the diagnosis data being stored in the numerical control apparatus as image data formation, an image data (128 bits) for one character in the character representation, for example as shown in FIG. 5, is transformed into a character code data (8 bits) performing data-compression (to one-sixteenth size) to make compressed diagnosis data consisting of character-coded data and image data which could not be character-coded, so that it is possible to quickly transmit the diagnosis data to the terminal unit.

As for the communication means for the remote diagnosis system in the above-detailed embodiment, a modem, a telephone line, in LAN (Local Area Network) and the like can be used.

According to the remote diagnosis system for the numerical control apparatus of the present invention, the diagnose data being stored in the numerical control apparatus as image data formation are transformed into character codes as long as they can be character-coded, thereafter to be transmitted to the terminal unit, so that the diagnosis data can be quickly transmitted to the terminal unit even in the case of using a telephone line as a communication line, thus making it possible to improve the operativity of the terminal unit. Moreover, the terminal unit accepts the character code data carrying significant information, so that the terminal unit can automatically analyze the character code data by dividing the process to be conducted in the terminal unit, and thus makes it possible to improve the terminal unit efficiency of the remote diagnosis of the numerical control apparatus.

In the foregoing, the present invention has been described in conjunction with the preferred embodiments illustrated in the drawings. It should be however be appreciated that the invention is not restricted to these embodiments. Various modification and variations will readily occur to those skilled in the art without departing from the spirit and scope of the invention.

What is claimed is:

1. A remote diagnosis system for a numerical control apparatus which is capable of diagnosing the operation state of said numerical control apparatus by means of a terminal unit disposed away from said numerical control apparatus by transmitting image data of said numerical control apparatus from a diagnosis data transmitting unit attached thereto to said numerical control apparatus, comprising:

an image data read out means for reading out image data corresponding to one character in character representation from an image storage means bearing said image data, said image data including a number of dots which are in a first state; and a character coding means for counting the number of dots in said image data which are in said first state, and for comparing said image data with reference dot pattern data which have been initially indexed based on said number of dots in said first state and dot patterns in specific rasters of said image data, and for converting said image data into character code when said image data coincides with said reference dot pattern data and for generating a graphic code when said image data fails to coincide with said reference dot pattern data.

2. A remote diagnosis system for a numerical control apparatus as claimed in claim 1, wherein said image data read out means comprises an image storage memory for storing the image data, a write address counter for assigning inside addresses of said image storage memory, a column-address designating section for designating column-address of said image storage memory, a row-address designating section for designating row address of said image storage memory and a raster counter for counting raster numbers for said image storage memory.

* * * * *